N. NILSON.
SCALE.
APPLICATION FILED NOV. 9, 1907.
947,558.
Patented Jan. 25, 1910.
2 SHEETS—SHEET 1.
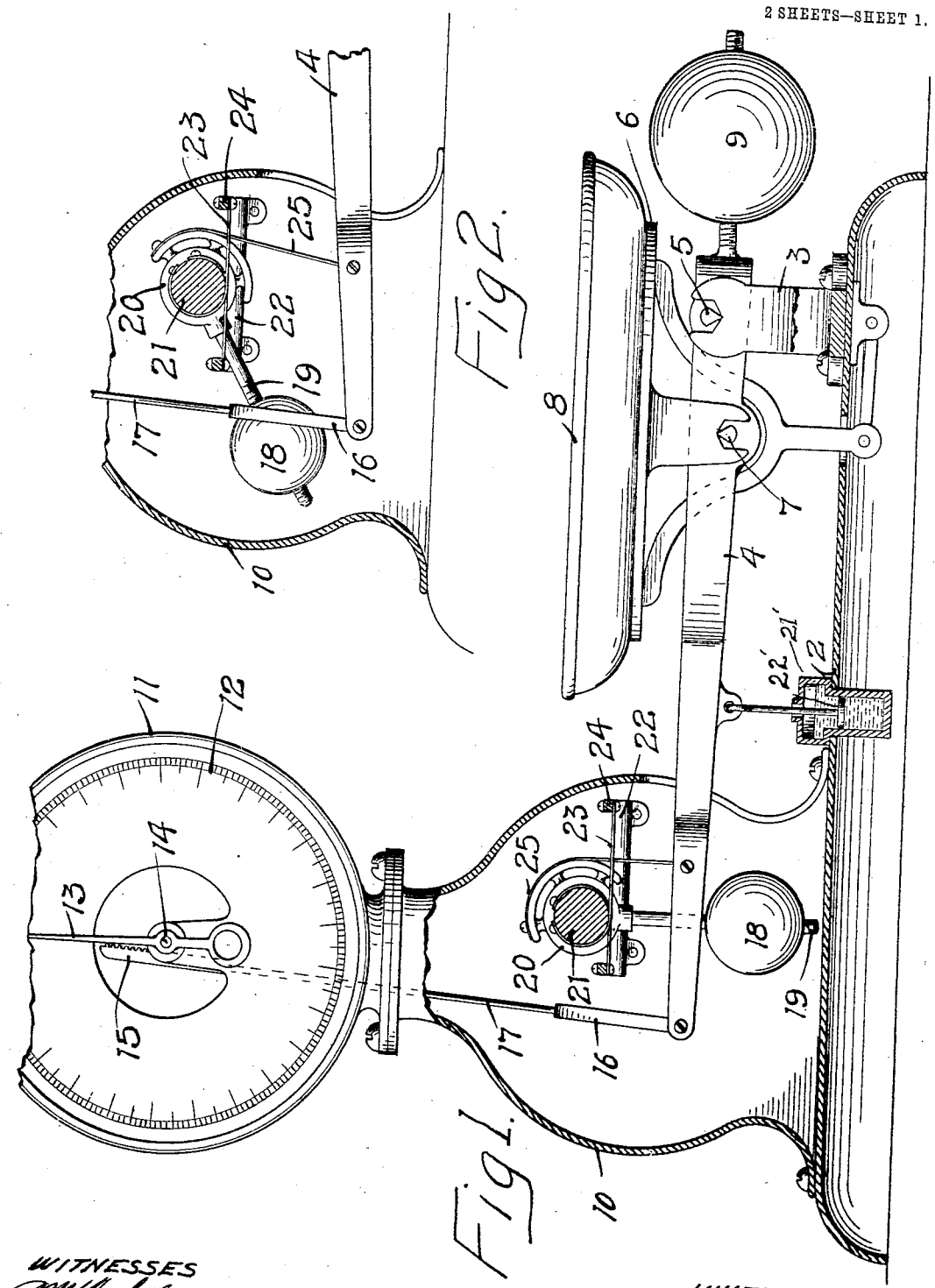
WITNESSES
INVENTOR
NILS NILSON
BY Paul & Paul
HIS ATTORNEYS N. NILSON.
SCALE.
APPLICATION FILED NOV. 9, 1907.
947,558.
Patented Jan. 25, 1910.
2 SHEETS—SHEET 2.
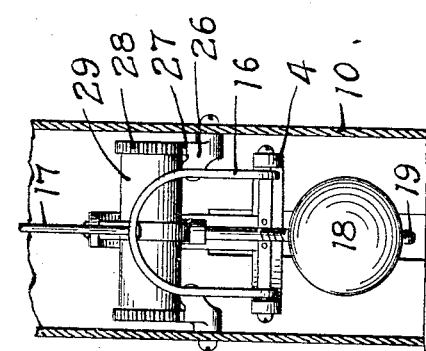
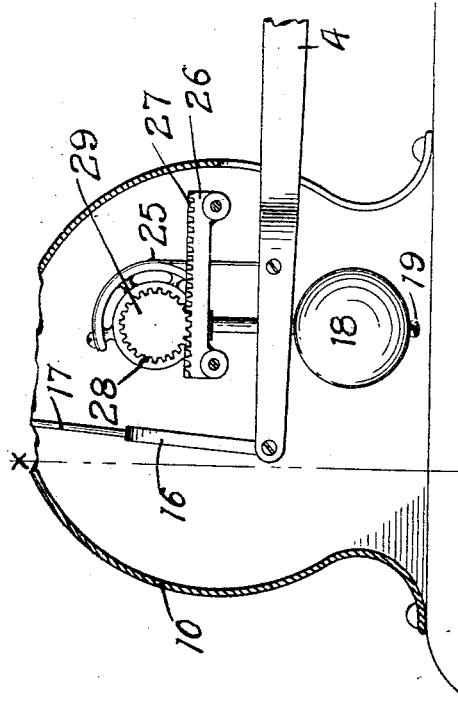
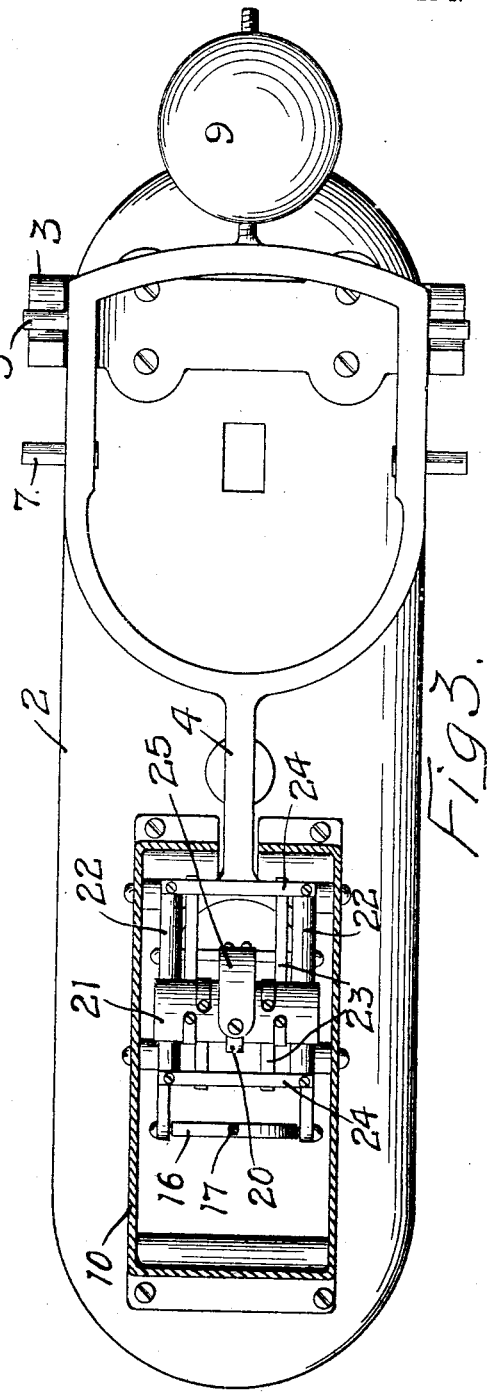
WITNESSES
INVENTOR
NILS NILSON
BY Paul & Paul
HIS ATTORNEYS

UNITED STATES PATENT OFFICE.

NILS NILSON, OF WAYZATA, MINNESOTA.

SCALE.

947,558.  Specification of Letters Patent.  Patented Jan. 25, 1910.

Application filed November 9, 1907. Serial No. 401,379.

*To all whom it may concern:*

Be it known that I, NILS NILSON, of Wayzata, Hennepin county, Minnesota, have invented certain new and useful Improvements in Scales, of which the following is a specification.

The object of my invention is to dispense with the necessity of providing a graduated scale beam and moving a weight back and forth thereon by hand to balance the load on the scale.

A further object is to provide a scale having a circular dial and an indicator hand therefor, and means whereby the graduations can be evenly spaced around the entire circle of the dial and accurate weighing obtained.

The invention consists generally in an oscillating balance weight having a movable fulcrum and attached to the scale beam.

Further, the invention consists in an improved form of rolling fulcrum whereby the scale is adapted for weighing very heavy loads.

Further, the invention consists in various constructions and combinations, all as hereinafter described and particularly pointed out in the claims.

In the accompanying drawings, forming part of this specification, Figure 1 is a side elevation partially in section, of a scale embodying my invention showing the normal position of the beam and indicator. Fig. 2 is a detail sectional view illustrating the position assumed by the beam and weight when a load is placed on the scale. Fig. 3 is a horizontal plan view partially in section. Fig. 4 is a detail sectional view illustrating a modified construction. Fig. 5 is a sectional view on the line x—x of Fig. 4.

In the drawing, 2 represents a suitable base having standards 3 thereon upon which the scale beam 4 is supported by knife edge pivots 5 in the usual way.

6 is the scale platform having a knife-edge pivot 7 on the beam and provided with a receptacle 8. A weight 9 is adjustably mounted on the end of the beam. This portion of the scale is of ordinary construction and I make no claim thereto.

10 is a housing supported upon the base 2 and carrying a circular frame 11 wherein the graduated disk 12 is arranged.

An indicator hand 13 is mounted on a stud 14 and a toothed bar 15 is arranged to engage a pinion (not shown) on the stud 14 and move the indicator hand 13 past the graduations on the dial.

The end of the scale beam is forked as indicated in Fig. 5 and a yoke 16 is pivoted thereon and connected with the rack bar 15 by a rod 17 so that movement of the scale beam up and down will revolve the indicator hand past the dial graduations.

The ordinary counter scale of this type is provided with a graduated beam and a movable weight, the clerk adjusting the weight back and forth on the beam to balance the scale. Dial scales using an oscillating weight have been patented, but with the graduations arranged on a straight line on the dial, or if on a curve unequally spaced to compensate for the difference in travel of the oscillating weight. To provide the dial with circular graduations equally spaced from one another and at the same time obtain an accurate weighing scale I provide a weight 18 adjustably mounted on a rod 19 that is secured to a hub 20 mounted on the middle portion of a roller 21. Rods 22 are arranged parallel with one another and secured to the inner wall of the housing 10 and have curved upper surfaces upon which the roller 21 rests and is adapted to roll lengthwise of the rods. These rods form a very substantial support for the roller and at the same time the roller will move under very slight influence, or in other words it is very sensitive to changes in the weight of the article on the scale. The curved surface of the roller and the curved surfaces of the rods form very substantial bearings and enable me to utilize the construction in large scales where it would be difficult to employ the ordinary knife edge owing to the danger of crushing or damaging the bearing with the strain of the oscillating balance weight thereon. My construction permits the use of a large heavy balance weight without damage to the roller bearing.

Metal strips or ribbons 23 are attached at one end to the periphery of the roller 21 and at their other ends are held by clamps 24 on the ends of the rods 22. These ribbons are flexible and are adapted to wrap around the periphery of the roller as it rolls in one direction and unwind and permit the roller to roll freely in the opposite direction. I prefer to provide a pair of these ribbons on each end of the roller, one ribbon of each pair being wound on the roller as it rolls in one direction and the other ribbons of the pairs being wound on the roller when it is rolled in the opposite direction. Thus the pairs of ribbons are alternately wound and unwound as the roller rolls back and forth. The roller is thus held in its proper position on the rods and cannot get out of place. The curved surface of the roller bearing on the corresponding surfaces of the rods 22 produces very little friction and the roller rolls back and forth without being retarded and with comparatively little resistance to its movement.

The hub 20 is provided with a strap 25 which connects it with the beam 4 at a point between the arms of its forked end. The rod 19 depends between the arms of the fork and oscillates therein as the beam is moved.

The weight 18 takes the place of the balance weight on the scale beam. The balance weight moves in a straight line following the horizontal graduations on the scale. The weight 18 swings on the arc of a circle and from its starting point toward the completion of the first quarter of the revolution its movement gradually increases for each graduation of the beam. In other words, the weight swinging on the arc of a circle must travel a greater distance between two points representing graduations on the scale beam than a weight would travel, moving in a horizontal direction over the same graduations. This would be apparent if we draw a horizontal line representing the scale beam and mark the pound graduations thereon, then draw a series of vertical lines at right angles to the horizontal one intersecting the graduation marks. In moving a balance weight on the scale beam each space between the vertical lines would represent a pound and the weight would be moved the same distance each time. With the weight 18, however, swinging on the arc of a circle this movement for the first pound would be substantially the same as though it moved in a straight line. As its motion continues its travel for each pound increases owing to the curvature of its path toward the quarter, and in consequence with a fixed fulcrum for the weight 18 the scale would be inaccurate unless the graduations on the dial were spaced proportionately to the increase in travel of the oscillating weight. To avoid this irregular spacing of the dial which detracts considerably from the appearance of the scale and interferes somewhat with the weighing operation I provide the rolling fulcrum or roller 21 heretofore described in detail, the weight 18 being supported thereby and the hub mounted on the fulcrum being connected to the scale beam by a flexible strap so that as the scale beam descends with the weight of the load the fulcrum will be rocked and as it rolls on its bearings and swings the weight toward a horizontal position the leverage of the weight on the fulcrum will be gradually increased to compensate for the difference of its travel.

To aid in bringing the scale to a balance I prefer to provide the dash pot 21' in the base of the scale and a plunger 22' therein connected with the scale beam. This dash pot device is of ordinary construction and has been used before with scales of this type and I make no claim to the same herein.

The diameter of the roller and the length of the arm 19 may be accurately determined so that the increase in the leverage of the weight on its fulcrum will be exactly commensurate with the increase in the travel of the weight in the first quarter of its revolution. With this arrangement I am able to provide a dial having a complete circle of graduations evenly spaced and uniform and indicating accurately the exact weight of the article on the scale.

In Figs. 4 and 5 I have illustrated a modified construction which consists in providing supporting rails 26 having teeth 27 on their upper surfaces adapted to mesh with teeth 28 provided on the ends of the roller 29. In other respects the mechanism corresponds to that previously described and its operation is similar. I am able, however, to omit the ribbons connecting the rails with the roller and I have found that the toothed rails engaging the gears on the ends of the rollers form a very accurate and sensitive means for guiding the oscillating balance weight.

I claim as my invention:

1. In a scale, the combination, with a scale beam, of a dial having graduations arranged on a curved line thereon, and an indicator hand for said dial, a roller and bearings therefor, means connecting said scale beam with the periphery of said roller, an arm carried by said roller and provided with a balance weight, means actuated by the movement of the scale beam for operating said indicator hand, the distance between the point of contact of said roller on its supports and said balance weight increasing with the oscillation of said arm toward a horizontal position to compensate for the increase in travel of the weight as it approaches a horizontal position, thereby permitting uniform spacing of the dial graduations.

2. The combination, with a scale beam, and means for indicating the weight of an article placed on the scale, of a horizontally moving roller, a track therefor, an arm carried by said roller, a balance weight mounted on said arm, means connecting said roller with said beam, means connecting said beam with said weight indicating means the distance between the point of contact of said roller with its support and the center of said balance weight increasing as said arm swings from a vertical toward a horizontal position to compensate for the increase in travel of the weight as it approaches a horizontal position.

In witness whereof, I have hereunto set my hand this 5th day of November 1907.

NILS NILSON.

Witnesses:
J. B. BYINGTON,
C. G. HANSON.